United States Patent
Hagemeyer et al.

(10) Patent No.: US 7,270,798 B2
(45) Date of Patent: Sep. 18, 2007

(54) NOBLE METAL-FREE NICKEL CATALYST FORMULATIONS FOR HYDROGEN GENERATION

(75) Inventors: Alfred Hagemeyer, Sunnyvale, CA (US); Christopher James Brooks, Dublin, OH (US); Raymond E. Carhart, Cupertino, CA (US); Karin Yaccato, Santa Clara, CA (US); Michael Herrmann, Aglasterhausen-Michelbach (DE)

(73) Assignees: Honda Giken Kogyo Kabushiki Kaisha, Tokyo (JP); Symyx Technologies, Inc., Santa Clara, CA (US)

( * ) Notice: Subject to any disclaimer, the term of this patent is extended or adjusted under 35 U.S.C. 154(b) by 141 days.

(21) Appl. No.: 10/739,993

(22) Filed: Dec. 18, 2003

(65) Prior Publication Data

US 2004/0176245 A1 Sep. 9, 2004

Related U.S. Application Data

(60) Provisional application No. 60/434,631, filed on Dec. 20, 2002.

(51) Int. Cl.
| | |
|---|---|
| *C01B 3/16* | (2006.01) |
| *B01J 23/755* | (2006.01) |
| *B01J 23/80* | (2006.01) |
| *B01J 23/825* | (2006.01) |
| *B01J 23/84* | (2006.01) |

(52) U.S. Cl. .................. 423/655; 423/656; 502/325; 502/328; 502/335

(58) Field of Classification Search ............ 423/656, 423/655; 502/335
See application file for complete search history.

(56) References Cited

U.S. PATENT DOCUMENTS

| 3,475,126 A | 10/1969 | Taylor |
| 4,131,569 A * | 12/1978 | Michel et al. ............ 502/303 |
| 4,367,166 A | 1/1983 | Fujitani et al. |

(Continued)

FOREIGN PATENT DOCUMENTS

EP 0 189 701 A1 8/1986

(Continued)

OTHER PUBLICATIONS

NexTech Materials; Print-out of website "http://www.nextechmaterials.com/products.htm"; Mar. 2001; 3 pages.

(Continued)

*Primary Examiner*—Wayne A. Langel
(74) *Attorney, Agent, or Firm*—Prass & Irving, LLP; Mark E. Duell; Ronald A. Krasnow

(57) ABSTRACT

The invention relates to methods of using noble metal-free nickel catalysts to generate a hydrogen-rich gas from gas mixtures containing carbon monoxide and water, such as water-containing syngas mixtures, where the nickel may exist in either a supported or a bulk state. The noble metal-free water gas shift catalyst of the invention comprises Ni in either a supported or a bulk state and at least one of Ge, Cd, In, Sn, Sb, Te, Pb, their oxides and mixtures thereof. The invention is also directed toward noble metal-free nickel catalysts that exhibit both high activity and selectivity to hydrogen generation and carbon monoxide oxidation.

27 Claims, 10 Drawing Sheets
(10 of 10 Drawing Sheet(s) Filed in Color)

U.S. PATENT DOCUMENTS

| | | | |
|---|---|---|---|
| 4,629,612 A * | 12/1986 | van der Wal et al. | ... 423/244.02 |
| 4,693,882 A | 9/1987 | Setzer et al. | |
| 4,810,485 A | 3/1989 | Marianowski et al. | |
| 5,030,440 A | 7/1991 | Lywood et al. | |
| 5,134,109 A | 7/1992 | Uchiyama et al. | |
| 5,368,835 A | 11/1994 | Choudhary et al. | |
| 5,478,370 A | 12/1995 | Spangler | |
| 5,498,404 A | 3/1996 | Hansen et al. | |
| 5,500,198 A * | 3/1996 | Liu et al. | ... 423/437.1 |
| 5,599,517 A | 2/1997 | Ul-Haque et al. | |
| 5,653,774 A | 8/1997 | Bhattacharyya et al. | |
| 5,830,425 A | 11/1998 | Schneider et al. | |
| 5,877,377 A | 3/1999 | Golunski et al. | |
| 5,997,835 A | 12/1999 | Hyldtoft et al. | |
| 6,019,954 A | 2/2000 | Tang et al. | |
| 6,083,425 A | 7/2000 | Clawson et al. | |
| 6,123,913 A | 9/2000 | Clawson et al. | |
| 6,156,084 A | 12/2000 | Bonville, Jr. et al. | |
| 6,221,117 B1 | 4/2001 | Edlund et al. | |
| 6,238,816 B1 | 5/2001 | Cable et al. | |
| 6,254,807 B1 | 7/2001 | Schmidt et al. | |
| 6,293,979 B1 | 9/2001 | Choudhary et al. | |
| 6,299,995 B1 | 10/2001 | Abdo et al. | |
| 6,303,098 B1 | 10/2001 | Kramarz et al. | |
| 6,312,660 B1 | 11/2001 | Yagi et al. | |
| 6,340,437 B1 | 1/2002 | Yagi et al. | |
| 6,616,909 B1 * | 9/2003 | Tonkovich et al. | ... 423/648.1 |
| 6,623,720 B2 | 9/2003 | Thompson et al. | |
| 6,692,545 B2 | 2/2004 | Gittleman et al. | |
| 6,723,298 B1 | 4/2004 | Baumann et al. | |
| 6,784,135 B2 | 8/2004 | Scholten et al. | |
| 6,821,925 B2 * | 11/2004 | Carruthers et al. | ... 502/355 |
| 6,969,505 B2 * | 11/2005 | Tonkovich et al. | ... 423/648.1 |
| 2001/0005559 A1 | 6/2001 | Takemura et al. | |
| 2001/0009653 A1 | 7/2001 | Clawson et al. | |
| 2001/0055560 A1 | 12/2001 | Schiodt et al. | |
| 2002/0009408 A1 | 1/2002 | Weiland et al. | |
| 2002/0061277 A1 | 5/2002 | Ruettinger et al. | |
| 2003/0026747 A1 | 2/2003 | Zhu et al. | |

FOREIGN PATENT DOCUMENTS

EP   1 149 799 A1   10/2001

OTHER PUBLICATIONS

Xue, E., O'Keeffe, M., Ross, J.R.H.; Water-gas shift conversion using a feed with a low steam to carbon monoxide ratio and containing sulphur; Catalysis Today, 1996, vol. 30, pp. 107-118; Elsevier Science B.V., The Netherlands, no month.

Hilaire, S., Wang, X., Luo, T., Gorte, R.J., Wagner, J.; A comparative study of water-gas-shift reaction over ceria-supported metallic catalysts; Applied Catalysis A: General, 2001, vol. 25, pp. 271-278; Elsevier Science B.V., The Netherlands, no month.

Rase, H.F., editor; Chapter 19—Synthesis Gas and Its Products; Handbook of Commercial Catalysts-Heterogeneous Catalysts, 2000, pp. 403-426;CRC Press, Boca Raton, Florida, US, no month.

Li, Yue, Fu, Qi, Flytzani-Stephanopoulos, Maria; Low-temperature water-gas shift reaction over cu- and Ni-loaded cerium oxide catalysts; Applied Catalysis B: Environmental, 2000, vol. 27; pp. 179-191; Elsevier Science B.V., The Netherlands, no month.

\* cited by examiner

Ni bulk 15 mods MT plate

FIG. 3 D   ZrO2 CeO2 carriers

50 PT PtAuAgCe

PtAuAgCeZr

NOBLE METAL-FREE NICKEL CATALYST FORMULATIONS FOR HYDROGEN GENERATION

CROSS-REFERENCE TO RELATED APPLICATIONS

The present application claims benefit from earlier filed U.S. Provisional Application No. 60/434,631, filed Dec. 20, 2002, which is incorporated herein in its entirety by reference for all purposes. The present application also incorporates by reference PCT International Patent Application No. US2003/040386, entitled "Noble Metal-Free Nickel Catalyst Formulations For Hydrogen Generation" naming as inventors Hagemeyer et al. filed on the same day as the present application.

BACKGROUND OF THE INVENTION

1. Field of the Invention

This invention relates to methods and catalysts to generate a hydrogen-rich gas from gas mixtures containing carbon monoxide and water, such as water-containing syngas mixtures. More particularly, the invention includes methods using noble metal-free nickel catalysts where the nickel may exist in either a supported or a bulk state. Catalysts of the invention exhibit both high activity and selectivity to hydrogen generation and carbon monoxide oxidation.

2. Discussion of the Related Art

Numerous chemical and energy-producing processes require a hydrogen-rich composition (e.g. feed stream.) A hydrogen-rich feed stream is typically combined with other reactants to carry out various processes. Nitrogen fixation processes, for example, produce ammonia by reacting feed streams containing hydrogen and nitrogen under high pressures and temperatures in the presence of a catalyst. In other processes, the hydrogen-rich feed stream should not contain components detrimental to the process. Fuel cells such as polymer electrode membrane ("PEM") fuel cells, produce energy from a hydrogen-rich feed stream. PEM fuel cells typically operate with a feed stream gas inlet temperature of less than 450° C. Carbon monoxide is excluded from the feed stream to the extent possible to prevent poisoning of the electrode catalyst, which is typically a platinum-containing catalyst. See U.S. Pat. No. 6,299,995.

One route for producing a hydrogen-rich gas is hydrocarbon steam reforming. In a hydrocarbon steam reforming process steam is reacted with a hydrocarbon fuel, such as methane, iso-octane, toluene, etc., to produce hydrogen gas and carbon dioxide. The reaction, shown below with methane ($CH_4$), is strongly endothermic; it requires a significant amount of heat.

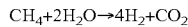

$$CH_4 + 2H_2O \rightarrow 4H_2 + CO_2$$

In the petrochemical industry, hydrocarbon steam reforming of natural gas is typically performed at temperatures in excess of 900° C. Even for catalyst assisted hydrocarbon steam reforming the temperature requirement is often still above 700° C. See, for example, U.S. Pat. No. 6,303,098. Steam reforming of hydrocarbons, such as methane, using nickel- and gold-containing catalysts and temperatures greater than 450° C. is described in U.S. Pat. No. 5,997,835. The catalyzed process forms a hydrogen-rich gas, with depressed carbon formation.

One example of effective hydrocarbon steam reforming catalysts is the Sinfelt compositions which are composed of Pt, a Group 11 metal, and a Group 8-10 metal. Group 11 metals include Cu, Ag and Au while Group 8-10 metals include the other noble metals. These catalyst formulations are well known in the promotion of hydrogenation, hydrogenolysis, hydrocracking, dealkylation of aromatics, and naphtha reforming processes. See, for example, U.S. Pat. Nos. 3,567,625 and 3,953,368. The application of catalysts based on the Sinfelt model to the water gas shift ("WGS") reaction, in particular at conditions suitable for lower temperature WGS applications such as PEM fuel cells, has not been previously reported.

Purified hydrogen-containing feed streams have also been produced by filtering the gas mixture produced by hydrocarbon steam reformation through hydrogen-permeable and hydrogen-selective membranes. See, for example, U.S. Pat. No. 6,221,117. Such approaches suffer from drawbacks due to the complexity of the system and slow flow rates through the membranes.

Another method of producing a hydrogen-rich gas such as a feed stream starts with a gas mixture containing hydrogen and carbon monoxide with the absence of any substantial amount of water. For instance, this may be the product of reforming a hydrocarbon or an alcohol, and selectively removes the carbon monoxide from that gas mixture. The carbon monoxide can be removed by absorption of the carbon monoxide and/or by its oxidation to carbon dioxide. Such a process utilizing a ruthenium based catalyst to remove and oxidize the carbon monoxide is disclosed in U.S. Pat. No. 6,190,430.

The WGS reaction is another mechanism for producing a hydrogen-rich gas but from water (steam) and carbon monoxide. An equilibrium process, the water gas shift reaction, shown below, converts water and carbon monoxide to hydrogen and carbon dioxide, and vice versa.

$$H_2O + CO \rightleftharpoons H_2 + CO_2$$

Various catalysts have been developed to catalyze the WGS reaction. These catalysts are typically intended for use at temperatures greater than 450° C. and/or pressures above 1 bar. For instance, U.S. Pat. No. 5,030,440 relates to a palladium and platinum-containing catalyst formulation for catalyzing the shift reaction at 550-650° C. See also U.S. Pat. No. 5,830,425 for an iron/copper based catalyst formulation.

Catalytic conversion of water and carbon monoxide under water gas shift reaction conditions has been used to produce hydrogen-rich and carbon monoxide-poor gas mixtures. Existing WGS catalysts, however, do not exhibit sufficient activity at a given temperature to reach or even closely approach thermodynamic equilibrium concentrations of hydrogen and carbon monoxide such that the product gas may subsequently be used as a hydrogen feed stream. Specifically, existing catalyst formulations are not sufficiently active at low temperatures, that is, below about 450° C. See U.S. Pat. No. 5,030,440.

Platinum (Pt) is a well-known catalyst for both hydrocarbon steam reforming and water gas shift reactions. Under typical hydrocarbon steam reforming conditions, high temperature (above 850° C.) and high pressure (greater than 10 bar), the WGS reaction may occur post-reforming over the hydrocarbon steam reforming catalyst due to the high temperature and generally unselective catalyst compositions. See, for instance, U.S. Pat. Nos. 6,254,807; 5,368,835;

5,134,109 and 5,030,440 for a variety of catalyst compositions and reaction conditions under which the water gas shift reaction may occur post-reforming.

Metals such as cobalt (Co), ruthenium (Ru), palladium (Pd), rhodium (Rh) and nickel (Ni) have also been used as WGS catalysts but are normally too active for the selective WGS reaction and cause methanation of CO to $CH_4$ under typical reaction conditions. In other words, the hydrogen produced by the water gas shift reaction is consumed as it reacts with the CO present in the presence of such catalysts to yield methane. This methanation reaction activity has limited the utility of metals such as Co, Ru, Pd, Rh and Ni as water gas shift catalysts.

A need exists, therefore, for a efficient and economical method to produce a hydrogen-rich syngas, and cost-effective catalysts which are highly active and highly selective for both hydrogen generation and carbon monoxide oxidation at moderate temperatures (e.g. below about 450° C.) to provide a hydrogen-rich syngas from a gas mixture containing hydrogen and carbon monoxide.

SUMMARY OF THE INVENTION

The invention meets the need for highly active, selective and economical catalysts for the generation of hydrogen and the oxidation of carbon monoxide and to thereby provide a hydrogen-rich gas, such as a hydrogen-rich syngas, from a gas mixture of at least carbon monoxide and water. Accordingly, the invention provides methods and catalysts for producing a hydrogen-rich gas.

The invention is, in a first general embodiment, a method for producing a hydrogen-rich gas (e.g., syngas) by contacting a CO-containing gas, such as a syngas mixture, with a noble metal-free nickel-containing water gas shift catalyst in the presence of water at a temperature of not more than about 450° C. In a second general embodiment, the noble metal-free water gas shift catalyst comprises Ni in either a supported or a bulk state and at least one of Ge, Cd, In, Sn, Sb, Te, Pb, their oxides and mixtures thereof. Carriers for the supported catalysts may be, for example, at least one member selected from the group consisting of alumina, zirconia, titania, ceria, magnesia, lanthania, niobia, yttria, iron oxide and mixtures thereof. The method of the invention may be conducted at a temperature ranging from about 150° C. to about 450° C.

In third general embodiment, the invention is directed to the aforementioned noble metal-free nickel-containing water gas shift catalysts in an apparatus for generating a hydrogen gas containing stream from a hydrocarbon or substituted hydrocarbon feed stream. The apparatus further comprises, in addition to the WGS catalyst, a fuel reformer, a water gas shift reactor and a temperature controller.

The following described preferred embodiments of the WGS catalyst can be used in each one of the three general embodiments or in specific, related embodiments (e.g., fuel cell reactors, fuel processors and hydrocarbon steam reformers.)

In one preferred embodiment, the water gas shift catalyst comprises Ni and at least one of Ge, Cd, In, Sn, Sb, Te, Pb, their oxides and mixtures thereof In a second preferred embodiment, the water gas shift catalyst comprises Ni in a bulk state and at least one of Ge, Cd, Sb, Te, Pb, their oxides and mixtures thereof.

In a third preferred embodiment, the water gas shift catalyst comprises Ni in a bulk state; In, its oxides or mixtures thereof; and Cd, its oxides or mixtures thereof.

In another preferred embodiment, the water gas shift catalyst comprises Ni in a bulk state; In, its oxides or mixtures thereof; and Sb, its oxides or mixtures thereof.

In another preferred embodiment, the water gas shift catalyst comprises Ni in a bulk state; Sn, its oxides or mixtures thereof; and Cd, its oxides or mixtures thereof.

In yet another preferred embodiment, the water gas shift catalyst comprises Ni in a bulk state; Sn, its oxides or mixtures thereof; and Sb, its oxides or mixtures thereof.

In yet another preferred embodiment, the water gas shift catalyst comprises Ni in a bulk state; Sn, its oxides or mixtures thereof; and Te, its oxides or mixtures thereof.

In yet another preferred embodiment, the water gas shift catalyst comprises supported Ni and at least one of In, Sn, Te, their oxides and mixtures thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

Figure 1A:
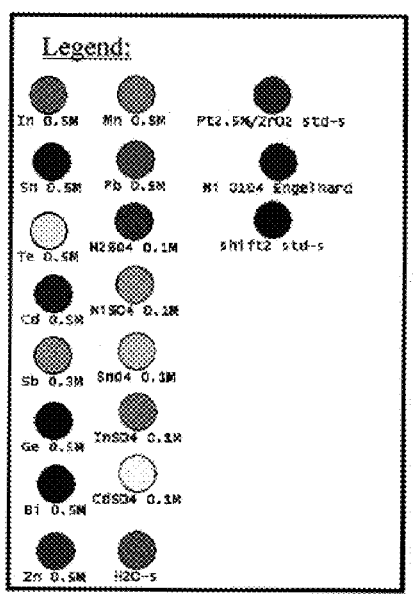
FIGS. 1A and 1B illustrate the process of producing a library test wafer.
Figure 1A:
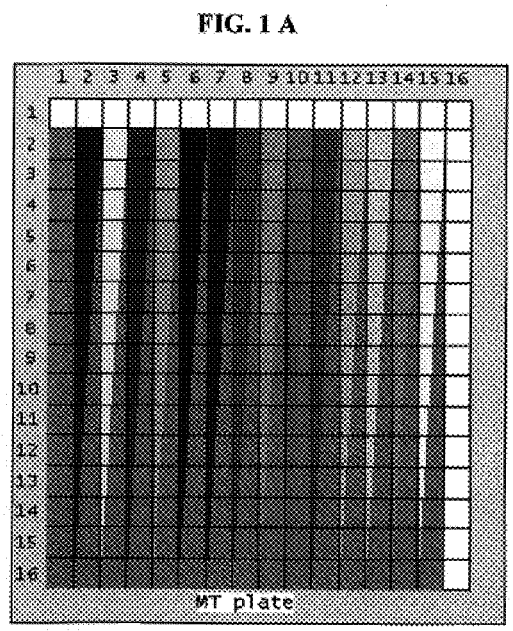
Figure 1:
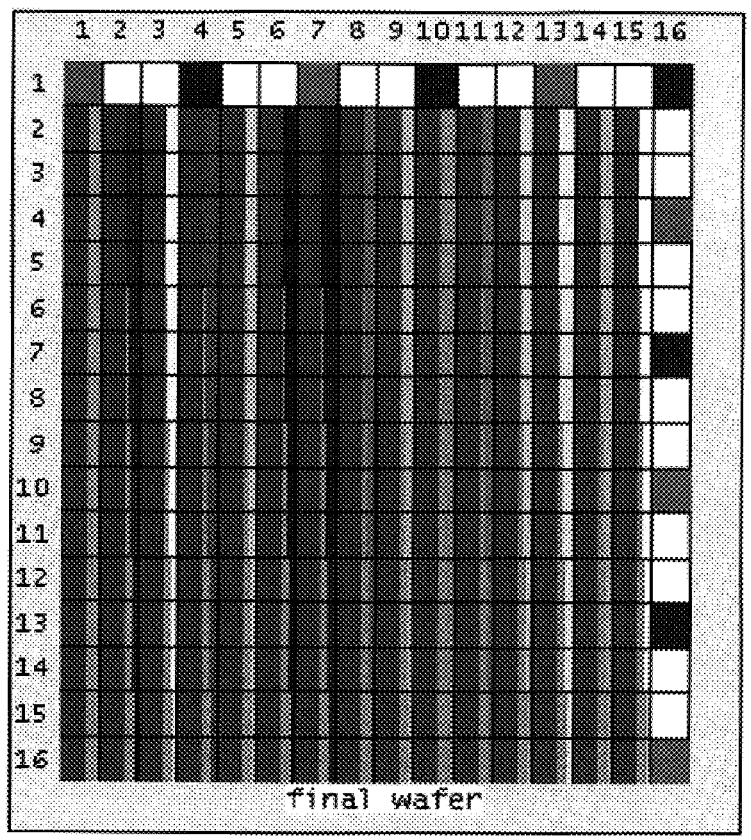
FIGS. 1C and 1D illustrate SpotFire plots of the CO and $H_2O$ conversion versus $CO_2$ production for the wafer under WGS conditions at various temperatures. The legend for FIG. 1A also applies to FIG. 1B exclusively.
Figure 1:
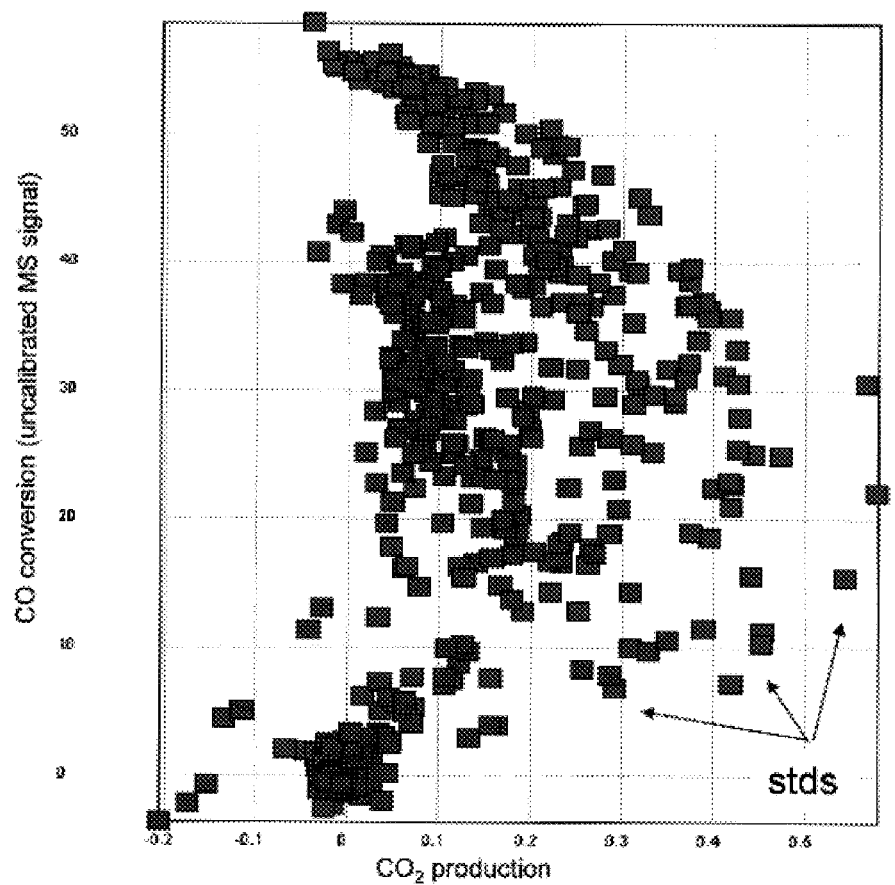
Figure 1:
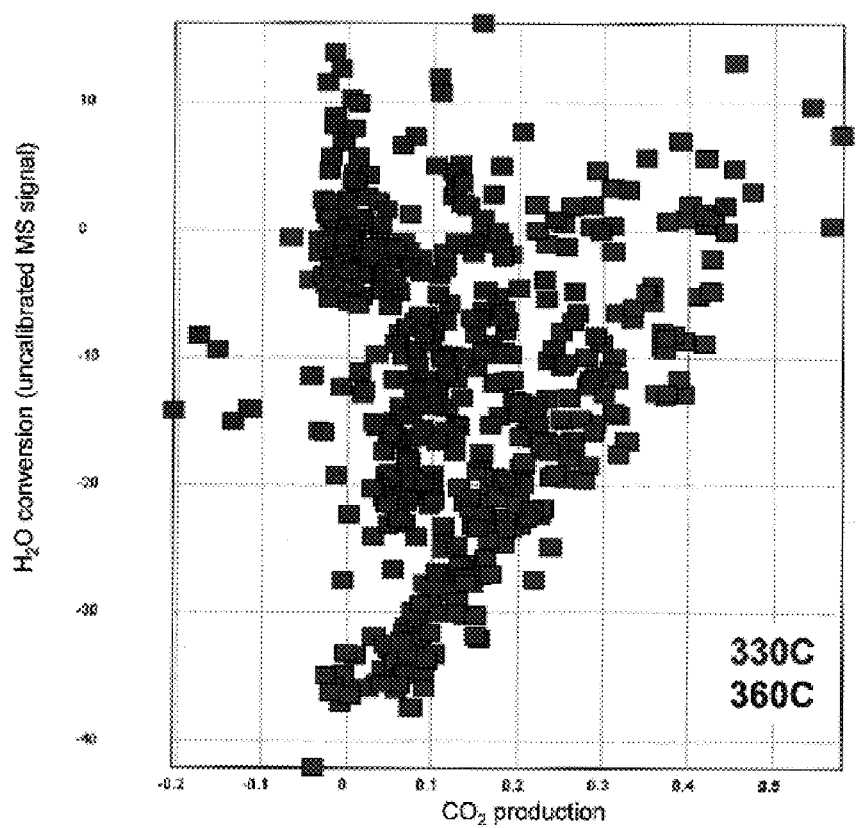

The invention relates to a method for producing a hydrogen-rich gas, such as a hydrogen-rich syngas. According to the method, a CO-containing gas, such as a CO-containing syngas, contacts a noble metal-free nickel-containing water gas shift catalyst, in the presence of water, preferably a stoichiometric excess of water, preferably at a reaction temperature of less than about 450° C. to produce a hydrogen-rich gas, such as a hydrogen-rich syngas. The reaction pressure is preferably not more than about 10 bar. The invention also relates to a noble metal-free nickel-containing water gas shift catalyst itself and to apparatus such as a water gas shift reactors and fuel processing apparatus comprising such WGS catalysts.

A water gas shift catalyst according to the invention comprises:

a) Ni and b) at least one of Ge, Cd, In, Sn, Sb, Te, Pb, their oxides and mixtures thereof.

The WGS catalyst may be supported on a carrier, such as any one member or a combination of alumina, zirconia, titania, ceria, magnesia, lanthania, niobia, zeolite, perovskite, silica clay, yttria and iron oxide.

The WGS catalysts of the invention comprise combinations of at least two metals or metalloids, selected from Ni and the group as indicated above, in each and every possible permutation and combination, except as specifically and expressly excluded. Although particular subgroupings of preferred combinations of metals or metalloids are also presented, the present invention is not limited to the particularly recited subgroupings.

Discussion regarding the particular function of various components of catalysts and catalyst systems is provided herein solely to explain the advantage of the invention, and is not limiting as to the scope of the invention or the intended use, function, or mechanism of the various components and/or compositions disclosed and claimed. As such, any discussion of component and/or compositional function is made, without being bound by theory and by current understanding, unless and except such requirements are expressly recited in the claims. Generally, for example, and without being bound by theory, Ni promotes the unwanted methanation reaction. The metals or metalloids of component b) may themselves have activity as WGS catalysts but function in combination with Ni to attenuate the methanation reaction and to impart beneficial properties to the catalyst of the invention.

Catalysts of the invention can catalyze the WGS reaction at varying temperatures, avoid or attenuate unwanted side reactions such as methanation reactions, as well as generate a hydrogen-rich gas, such as a hydrogen-rich syngas. The composition of the WGS catalysts of the invention and their use in WGS reactions are discussed below.

1. Definitions

Water gas shift ("WGS") reaction: Reaction which produces hydrogen and carbon dioxide from water and carbon monoxide, and vice versa:

Generally, and unless explicitly stated to the contrary, each of the WGS catalysts of the invention can be advantageously applied both in connection with the forward reaction as shown above (i.e., for the production of $H_2$), or alternatively, in connection with the reverse reaction as shown above (i.e., for the production of CO). As such, the various catalysts disclosed herein can be used to specifically control the ratio of $H_2$ to CO in a gas stream.

Methanation reaction: Reaction which produces methane and water from a carbon source, such as carbon monoxide or carbon dioxide, and hydrogen:

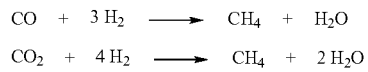

"Syngas" (also called synthesis gas): Gaseous mixture comprising hydrogen ($H_2$) and carbon monoxide (CO) which may also contain other gas components such as carbon dioxide ($CO_2$), water ($H_2O$), methane ($CH_4$) and nitrogen ($N_2$).

LTS: Refers to "low temperature shift" reaction conditions where the reaction temperature is less than about 250° C., preferably ranging from about 150° C. to about 250° C.

MTS: Refers to "medium temperature shift" reaction conditions where the reaction temperature ranges from about 250° C. to about 350° C.

HTS: Refers to "high temperature shift" reaction conditions where the reaction temperature is more than about 350° C. and up to about 450° C.

Hydrocarbon: Compound containing hydrogen, carbon, and, optionally, oxygen.

The Periodic Table of the Elements is based on the present IUPAC convention, thus, for example, Group 11 comprises Cu, Ag and Au. (See http://www.iupac.org dated May 30, 2002.)

As discussed herein, the catalyst composition nomenclature uses a dash (i.e., "-") to separate catalyst component groups where a catalyst may contain one or more of the catalyst components listed for each component group, brackets (i.e., "{ }") are used to enclose the members of a catalyst component group, "{two of . . . }" is used if two or more members of a catalyst component group are required to be present in a catalyst composition, "blank" is used within the "{ }" to indicate the possible choice that no additional element is added, and a slash (i.e., "/") is used to separate supported catalyst components from their support material, if any. Additionally, the elements within a catalyst composition formulation include all possible oxidation states, including oxides, or salts, or mixtures thereof.

Using this shorthand nomenclature in this specification, for example, "Pt—{Rh, Ni}—{Na, K, Fe, Os}/$ZrO_2$" would represent catalyst compositions containing Pt, one or more of Rh and Ni, and one or more of Na, K, Fe, and Os supported on $ZrO_2$; all of the catalyst elements may be in any possible oxidation state, unless explicitly indicated otherwise. "Pt—Rh—Ni-{two of Na, K, Fe, Os}" would represent a supported or unsupported catalyst composition containing Pt, Rh, and Ni, and two or more of Na, K, Fe, and Os. "Rh—{Cu, Ag, Au}—{Na, K, blank}/$TiO_2$" would represent catalyst compositions containing Rh, one or more of Cu, Ag and Au, and, optionally, and one of Na or K supported on $TiO_2$.

The description of a catalyst composition formulation as having an essential absence of an element, or being "element-free" or "substantially element free" does allow for the presence of an insignificant, non-functional amount of the specified element to be present, for example, as a non-functional impurity in a catalyst composition formulation. However, such a description excludes formulations where the specific element has been intentionally or purposefully added to the formulation to achieve a certain measurable benefit. Typically, with respect to noble metals such as Pt for example, amounts less than about 0.01 weight percentage would not usually impart a material functional benefit with respect to catalyst performance, and therefore such amounts would generally be considered as an insignificant amount, or not more than a mere impurity. In some embodiments, however, amounts up to less than about 0.04 weight percent may be included without a material functional benefit to catalyst performance. In other embodiments, amounts less than about 0.005 weight percent would be considered an insignificant amount, and therefore a non-functional impurity.

2. WGS Catalyst

A noble metal-free nickel containing water gas shift catalyst of the invention comprises:
  a) Ni and
  b) at least one of Ge, Cd, In, Sn, Sb, Te, Pb, their oxides and mixtures thereof.

The catalyst components are typically present in a mixture of the reduced or oxide forms; typically one of the forms will predominate in the mixture. The nickel may be in a supported state or in an unsupported bulk state. Suitable carriers for supported catalysts are discussed below.

The catalyst components are typically present in a mixture of the reduced or oxide forms; typically, one of the forms will predominate in the mixture. A WGS catalyst of the invention may be prepared by mixing the metals and/or metalloids in their elemental forms or as oxides or salts to form a catalyst precursor. This catalyst precursor mixture generally undergoes a calcination and/or reductive treatment, which may be in-situ (within the reactor), prior to use as a WGS catalyst. Without being bound by theory, the catalytically active species are generally understood to be species which are in the reduced elemental state or in other possible higher oxidation states. The catalyst precursor species are believed to be substantially completely converted to the catalytically active species by the pre-use treatment. Nonetheless, the catalyst component species present after calcination and/or reduction may be a mixture of catalytically active species such as the reduced metal or other possible higher oxidation states and uncalcined or unreduced species depending on the efficiency of the calcination and/or reduction conditions.

A. Catalyst Compositions

As discussed above, one embodiment of the invention is a noble metal-free nickel-containing catalyst for catalyzing the water gas shift reaction (or its reverse reaction). According to the invention, a WGS catalyst may have the following composition:
  a) Ni and
  b) at least one of Ge, Cd, In, Sn, Sb, Te, Pb, their oxides and mixtures thereof.

The amount of each component present in a given catalyst according to the present invention may vary depending on the reaction conditions under which the catalyst is intended to operate. Generally, the nickel component may be present in an amount ranging from about 0.05 wt. % to about 99 wt. %, preferably about 0.10 wt. % to about 99 wt. %, and more preferably about 0.50 wt. % to about 99 wt. %.

Component b) may be present in an amount ranging from about 5 wt. % to about 50 wt. %.

The above weight percentages are calculated based on the total weight of the catalyst component in its final state in the catalyst composition after the final catalyst preparation step (i.e., the resulting oxidation state or states) with respect to the total weight of all catalyst components plus the support material, if any. The presence of a given catalyst component in the support material and the extent and type of its interaction with other catalyst components may effect the amount of a component needed to achieve the desired performance effect.

Other WGS catalysts which embody the invention are listed below. Utilizing the shorthand notation discussed above, where each metal may be present in its reduced form or in a higher oxidation state. The following compositions are examples of preferred catalyst compositions:
  bulk Ni—{Ge, Cd, Sb, Te, Pb};
  bulk Ni—In—Cd;
  bulk Ni—In—Sb;
  bulk Ni—Sn—Cd;
  bulk Ni—Sn—Sb;
  bulk Ni—Sn—Te; and
  supported Ni—{In, Sn, Te}.

Some catalysts may be more advantageously applied in specific operating temperature ranges. For instance, some Ni containing catalysts are generally more active and selective under HTS conditions than at lower temperature ranges. Specifically, for example, a Ni-containing catalyst, including especially noble metal-free Ni-containing catalyst and at least one of component chosen from among the following: Ge, Cd, In, Sn, Sb, Te or Pb is preferred at HTS conditions.

B. Catalyst Component a): Ni

A first component in a catalyst of the invention is Ni, component a). Unmodified Ni has been shown to catalyze the methanation reaction under WGS conditions. However, according to the present invention, Ni may be converted to a highly active and selective WGS catalyst by adjusting the Ni loading and by combining with other catalyst components which may moderate the activity of the methanation reaction. According to the present invention, various non-noble metal dopants (e.g. Ge, Cd, In, Sn, Sb, Te and Pb) may be added to Ni to generate catalysts that are highly active and selective WGS catalysts, and exhibit increased selectivity for the WGS reaction over the competing methanation reaction.

Preferably, the Ni has to be reduced to the active metallic state prior to use, typically by a reduction pretreatment in $H_2$ at about 350° C. to about 400° C. because nickel oxide requires temperatures above about 300° C. for reduction to occur. Metallic nickel particles tend to sinter irreversibly at temperatures in excess of about 400° C. Mn and Cr are examples of dopants that stabilize Ni against sintering.

The Ni used in the catalysts of the invention may be dispersed through mixing with an inert binder/carrier/dispersant which decreases the overall achievable Ni loading. Alternatively, the Ni used in the catalysts may exist in an unsupported bulk state which reflects high Ni loading.

C. Catalyst Components b): "Functional" Metals or Metalloids

The WGS catalysts of the invention contain at least two metals or metalloids. In addition to the Ni as component a), discussed above, a WGS catalyst contains metals or metalloids which, when used in combination with Ni, function to impart beneficial properties to the catalyst of the invention. A catalyst of the invention, then, further comprises at least one of Ge, Cd, In, Sn, Sb, Te, Pb, their oxides and mixtures thereof as component b).

To minimize its methanizing properties, Ni may be combined with, for example, Group I, Group II and main group metals to form suitable WGS catalysts. In, Sn and Te are preferred dopants for supported Ni (i.e. low Ni loading) catalysts, whereas Cd, Pb and Ge are preferred dopants for bulk Ni (i.e. high Ni loading) catalysts.

Examples of carriers for the supported Ni catalysts include, for instance, alumina, zirconia, titania, ceria, magnesia, lanthania, niobia, yttria, zeolite, perovskite, silica clay, cobalt oxide, iron oxide and mixtures thereof. Preferred carriers include cobalt oxide, zirconia and titania. Perovskite may also be utilized as a support for the inventive catalyst formulations. A preferred supported catalyst is, for example, Ni—Sn—Te/$ZrO_2$.

D. Functional Classification of Catalyst Components

Without limiting the scope of the invention, discussion of the functions of the various catalyst components is offered, along with a template for composing catalyst compositions according to the invention. The following classification of catalyst components will direct one of skill in the art in the selection of various catalyst components to formulate WGS catalyst compositions according to the present invention and depending on the reaction conditions of interest.

Furthermore, according to the invention, there are several classes of catalyst components and metals which may be incorporated into a water gas shift catalyst. Hence, the various elements recited as components in any of the described embodiments (e.g., as component (b)), may be included in any various combination and permutation to achieve a catalyst composition that is coarsely or finely tuned for a specific application (e.g. including for a specific set of conditions, such as, temperature, pressure, space velocity, catalyst precursor, catalyst loading, catalyst surface area/presentation, reactant flow rates, reactant ratios, etc.). In some cases, the effect of a given component may vary with the operating temperature for the catalyst. These catalyst components may function as, for instance, activators or moderators depending upon their effect on the performance characteristics of the catalyst. For example, if greater activity is desired, an activator may be incorporated into a catalyst, or a moderator may be replaced by at least one activator or, alternatively, by at least one moderator one step further up the "activity ladder." An "activity ladder" ranks secondary or added catalyst components, such as activators or moderators, in order of the magnitude of their respective effect on the performance of a principal catalyst constituent. Conversely, if WGS selectivity of a catalyst needs to be increased (e.g., decrease the occurrence of the competing methanation reaction), then either an activator may be removed from the catalyst or, alternatively, the current moderator may be replaced by at least one moderator one step down the "activity ladder." The function of these catalyst component may be further described as "hard" or "soft" depending on the relative effect obtained by incorporating a given component into a catalyst. The catalyst components may be metals, metalloids, or non-metals. For the catalysts of the invention, for example, In, Sn and Te are soft moderators that are preferred for supported Ni systems whereas hard (i.e. more deactivating) moderators such as Ge, Cd and Pb are preferred for the bulk Ni systems.

Typically, a WGS catalyst suitable for use under LTS conditions employs, for example, activators and may only be minimally moderated, if at all, because activation is generally the important parameter to be considered under LTS conditions. Such LTS catalysts also may preferably employ high surface area carriers to enhance catalyst activity. Conversely, WGS catalysts used in HTS conditions may benefit from the catalyst being moderated because selectivity and methanation are parameters to be considered. Such HTS catalysts may use, for example, low surface area carriers. Accordingly, operating temperature may be considered in selecting a WGS catalyst according to the present invention for a particular operating environment.

Moderators may also include Ge, Cd, In, Sn, Sb and Te. Typically, for moderators to exert a moderating function on Ni, they should be substantially in the reduced or metallic state. Ge alloyed with Sn is an example of an alloy that was found to be highly active, even for low temperature systems, when in the fully oxidized state, that is, when treated at a pre-reduction temperature of about 300° C. which reduces the noble metals (such as Pt, Rh, or Pd) selectively but does not change the active oxidized state of the redox dopants in a catalyst composition.

E. Supports

The support or carrier may be any support or carrier used with the catalyst which allows the water gas shift reaction to proceed. The support or carrier may be a porous, adsorptive, high surface area support with a surface area of about 25 to about 500 $m^2/g$. The porous carrier material may be relatively inert to the conditions utilized in the WGS process, and may include carrier materials that have traditionally be utilized in hydrocarbon steam reforming processes, such as, (1) activated carbon, coke, or charcoal; (2) silica or silica gel, silicon carbide, clays, and silicates including those synthetically prepared and naturally occurring, for example, china clay, diatomaceous earth, fuller's earth, kaolin, etc.; (3) ceramics, porcelain, bauxite; (4) refractory inorganic oxides such as alumina, titanium dioxide, zirconium oxide, magnesia, etc.; (5) crystalline and amorphous aluminosilicates such as naturally occurring or synthetically prepared mordenite and/or faujasite; and, (6) combinations of these groups.

When a WGS catalyst of the invention is a supported catalyst, the support utilized may contain one or more of the metals (or metalloids) of the catalyst. The support may contain sufficient or excess amounts of the metal for the catalyst such that the catalyst may be formed by combining the other components with the support. Examples of such supports include ceria which can contribute cerium, Ce, to a catalyst, or iron oxide which can contribute iron, Fe. When such supports are used the amount of the catalyst component in the support typically may be far in excess of the amount of the catalyst component needed for the catalyst. Thus the support may act as both an active catalyst component and a support material for the catalyst. Alternatively, the support may have only minor amounts of a metal making up the WGS catalyst such that the catalyst may be formed by combining all desired components on the support.

Carrier screening with catalysts containing Pt as the only active noble metal revealed that a water gas shift catalyst may also be supported on a carrier comprising alumina, zirconia, titania, ceria, magnesia, lanthania, niobia, yttria and iron oxide. Perovskite ($ABO_3$) may also be utilized as a support for the inventive catalyst formulations.

Zirconia, titania and ceria may be supports for the present invention and provide high activity for the WGS reaction. Preferably, zirconia is in the monoclinic phase. Niobia, yttria and iron oxide carriers provide high selectivity but are also less active which is believed to be due to a lack of surface area. Pt on magnesia carriers formulated to have high surface areas (approximately 100 $m^2/g$) exhibit high selectivity but also exhibit activity which decreases rapidly with falling reaction temperature.

Iron, yttrium, and magnesium oxides may be utilized as primary layers on zirconia carriers to provide both higher surface area and low moderator concentration.

In general, alumina has been found to be an active but unselective carrier for Pt only containing WGS catalysts. However, the selectivity of gamma alumina may be improved by doping with Zr and/or Co or one of the rare earth elements, such as, for example, La and Ce. This doping may be accomplished by addition of the oxides or other salts such as nitrates, in either liquid or solid form, to the alumina. Other possible dopants to increase the selectivity include redox dopants, such as for instance, Re, Mo, Fe and basic dopants. Preferred is an embodiment of gamma alumina combined with Zr and/or Co which exhibits both high activity and selectivity over a broad temperature range.

High surface area aluminas, such as gamma-, delta- or theta-alumina are preferred alumina carriers. Other alumina carriers, such as mixed silica alumina, sol-gel alumina, as well as sol-gel or co-precipitated alumina-zirconia carriers may be used. Alumina typically has a higher surface area and a higher pore volume than carriers such as zirconia and offers a price advantage over other more expensive carriers.

F. Methods of Making a WGS Catalyst

As set forth above, a WGS catalyst of the invention may be prepared by mixing the metals and/or metalloids in their elemental forms or as oxides or salts to form a catalyst precursor, which generally undergoes a calcination and/or reductive treatment. Without being bound by theory, the catalytically active species are generally understood to be species which are in the reduced elemental state or in other possible higher oxidation states.

The WGS catalysts of the invention may be prepared by any well known catalyst synthesis processes. See, for example, U.S. Pat. Nos. 6,299,995 and 6,293,979. Spray drying, precipitation, impregnation, incipient wetness, ion exchange, fluid bed coating, physical or chemical vapor deposition are just examples of several methods that may be utilized to make the present WGS catalysts. Preferred approaches, include, for instance, impregnation or incipient wetness. The catalyst may be in any suitable form, such as, pellets, granular, bed, or monolith. See also co-pending U.S. patent application Ser. No. 10/739,428, entitled "Methods For The Preparation of Catalysts For Hydrogen Generation" to Hagemeyer et al. filed on the same date as the present application, for further details on methods of catalyst preparation and catalyst precursors. The complete disclosure of the above mentioned application and all other references cited herein are incorporated herein in their entireties for all purposes.

The WGS catalyst of the invention may be prepared on a solid support or carrier material. Preferably, the support or carrier is, or is coated with, a high surface area material onto which the precursors of the catalyst are added by any of several different possible techniques, as set forth above and as known in the art. The catalyst of the invention may be employed in the form of pellets, or on a support, preferably a monolith, for instance a honeycomb monolith.

Catalyst precursor solutions are preferably composed of easily decomposable forms of the catalyst component in a sufficiently high enough concentration to permit convenient preparation. Examples of easily decomposable precursor forms include the nitrate, amine, and oxalate salts. Typically chlorine containing precursors are avoided to prevent chlorine poisoning of the catalyst. Solutions can be aqueous or non-aqueous solutions. Exemplary non-aqueous solvents can include polar solvents, aprotic solvents, alcohols, and crown ethers, for example, tetrahydrofuran and ethanol. Concentration of the precursor solutions generally may be up to the solubility limitations of the preparation technique with consideration given to such parameters as, for example, porosity of the support, number of impregnation steps, pH of the precursor solutions, and so forth. The appropriate catalyst component precursor concentration can be readily determined by one of ordinary skill in the art of catalyst preparation.

Ni—Nickel nitrate, $Ni(NO_3)_2$, and nickel formate are both possible nickel precursors. The nickel formate may be prepared by dissolving $Ni(HCO_2)_2$ in water and adding formic acid, or by dissolving in dilute formic acid, to produce clear greenish solutions. Nickel acetate, $Ni(OAc)_2$, may be used as nickel precursor. $NiSO_4$ may also be used as a catalyst precursor. Nickel chloride, $NiCl_2$, may be used when precipitating Ni hydroxide or Ni carbonate. Catalyst poisoning due to residual chloride is not an issue for base metal catalysts such as bulk nickel as it is for noble metals. A bulk Ni catalyst (grade: 0104P) is commercially available from suppliers such as Engelhard.

Ge—Germanium oxalate may be prepared from amorphous Ge(IV) oxide, glycol-soluble $GeO_2$, (Aldrich) by reaction with 1M aqueous oxalic acid at room temperature. $H_2GeO_3$ may be prepared by dissolving $GeO_2$ in water at 80° C. and adding 3 drops of $NH_4OH$ (25%) to produce a clear, colorless $H_2GeO_3$ solution. $(NMe_4)_2GeO_3$ may be prepared by dissolving 0.25M $GeO_2$ in 0.1 M $NMe_4OH$. $(NH_4)_2GeO_3$ may be prepared by dissolving 0.25 M $GeO_2$ in 0.25M $NH_4OH$.

Cd—Cadmium nitrate is water soluble and a suitable catalyst precursor.

In—Indium formate and indium nitrate are preferred precursors for indium.

Sn—Tin oxalate produced by reacting the acetate with oxalic acid may be used as a catalyst precursor. Tin tartrate, $SnC_4H_4O_6$, in $NMe_4OH$ at about 0.25M Sn concentration, and tin acetate, also dissolved in $NMe_4OH$ at about 0.25M Sn concentration, may be used as catalyst precursors.

Sb—Ammonium antimony oxalate produced by reacting the acetate with oxalic acid and ammonia is a suitable antimony precursor. Antimony oxalate, $Sb_2(C_2O_4)_3$, available from Pfaltz & Bauer, is a water soluble precursor. Potassium antimony oxide, $KSbO_3$, and antimony citrate, prepared by stirring antimony(II) acetate in 1M citric acid at room temperature, are both possible catalyst precursors.

Te—Telluric acid, $Te(OH)_6$, may be used as a precursor for tellurium.

Pb—Lead nitrate is a possible lead precursor.

3. Producing a Hydrogen-rich Gas, such as, a Hydrogen-rich Syngas

The invention also relates to a method for producing a hydrogen-rich gas, such as a hydrogen-rich syngas. An additional embodiment of the invention may be directed to a method of producing a CO-depleted syngas.

A CO-containing gas, such as a syngas, contacts a water gas shift catalyst in the presence of water according to the method of the invention. The reaction preferably may occur at a temperature of less than 450° C. to produce a hydrogen-rich gas, such as a hydrogen-rich syngas.

A method of the invention may be utilized over a broad range of reaction conditions. Preferably, the method is conducted at a pressure of no more than about 75 bar, preferably at a pressure of no more than about 50 bar to produce a hydrogen-rich syngas. Even more preferred is to have the reaction occur at a pressure of no more than about 25 bar, or even no more than about 15 bar, or not more than about 10 bar. Especially preferred is to have the reaction occur at, or about atmospheric pressure. Depending on the formulation of the catalyst according to the present invention, the present method may be conducted at reactant gas temperatures ranging from less than about 250° C. to up to about 450° C. Preferably, the reaction occurs at a temperature selected from one or more temperature subranges of LTS, MTS and/or HTS as described above. Space velocities may range from about 1 $hr^{-1}$ up to about 1,000,000 $hr^{-1}$. Feed ratios, temperature, pressure and the desired product ratio are factors that would normally be considered by one of skill in the to determined a desired space velocity for a particular catalyst formulation.

4. Fuel Processor Apparatus

The invention further relates to a fuel processing system for generation of a hydrogen-rich gas from a hydrocarbon or substituted hydrocarbon fuel. Such a fuel processing system would comprise, for example, a fuel reformer, a water gas shift reactor and a temperature controller.

The fuel reformer would convert a fuel reactant stream comprising a hydrocarbon or a substituted hydrocarbon fuel to a reformed product stream comprising carbon monoxide and water. The fuel reformer may typically have an inlet for receiving the reactant stream, a reaction chamber for converting the reactant stream to the product stream and an outlet for discharging the product stream.

The fuel processor would also comprise a water gas shift reactor for effecting a water gas shift reaction at a temperature of less than about 450° C. This water gas shift reactor may comprise an inlet for receiving a water gas shift feed stream comprising carbon monoxide and water from the product stream of the fuel reformer, a reaction chamber having a water gas shift catalyst as described herein located therein and an outlet for discharging the resulting hydrogen-rich gas. The water gas shift catalyst would preferably be effective for generating hydrogen and carbon dioxide from the water gas shift feed stream.

The temperature controller may be adapted to maintain the temperature of the reaction chamber of the water gas shift reactor at a temperature of less than about 450° C.

5. Industrial Applications

Syngas is used as a reactant feed in number of industrial applications, including for example, methanol synthesis, ammonia synthesis, oxoaldehyde synthesis from olefins (typically in combination with a subsequent hydrogenation to form the corresponding oxoalcohol), hydrogenations and carbonylations. Each of these various industrial applications preferably includes a certain ratio of $H_2$ to CO in the syngas reactant stream. For methanol synthesis the ratio of $H_2$:CO is preferably about 2:1. For oxosynthesis of oxoaldehydes from olefins, the ratio of $H_2$:CO is preferably about 1:1. For ammonia synthesis, the ratio of $H_2$ to $N_2$ (e.g., supplied from air) is preferably about 3:1. For hydrogenations, syngas feed streams that have higher ratios of $H_2$:CO are preferred (e.g., feed streams that are $H_2$ enriched, and that are preferably substantially $H_2$ pure feed streams). Carbonylation reactions are preferably effected using feed streams that have lower ratios of $H_2$:CO (e.g., feed streams that are CO enriched, and that are preferably substantially CO pure feed streams).

The WGS catalysts of the present invention, and the methods disclosed herein that employ such WGS catalysts, can be applied industrially to adjust or control the relative ratio $H_2$:CO in a feed stream for a synthesis reaction, such as methanol synthesis, ammonia synthesis, oxoaldehyde synthesis, hydrogenation reactions and carbonylation reactions. In one embodiment, for example, a syngas product stream comprising CO and $H_2$ can be produced from a hydrocarbon by a reforming reaction in a reformer (e.g., by steam reforming of a hydrocarbon such as methanol or naphtha). The syngas product stream can then be fed (directly or indirectly after further downstream processing) as the feed stream to a WGS reactor, preferably having a temperature controller adapted to maintain the temperature of the WGS reactor at a temperature of about 450° C. or less during the WGS reaction (or at lower temperatures or temperature ranges as described herein in connection with the catalysts of the present invention). The WGS catalyst(s) employed in the WGS reactor are preferably selected from one or more of the catalysts and/or methods of the invention. The feed stream to the WGS reactor is contacted with the WGS catalyst(s) under reaction conditions effective for controlling the ratio of $H_2$:CO in the product stream from the WGS reactor (i.e., the "shifted product stream") to the desired ratio for the downstream reaction of interest (e.g., methanol synthesis), including to ratios described above in connection with the various reactions of industrial significance. As a non-limiting example, a syngas product stream from a methane steam reformer will typically have a $H_2$:CO ratio of about 6:1. The WGS catalyst(s) of the present invention can be employed in a WGS reaction (in the forward direction as shown above) to further enhance the amount of $H_2$ relative to CO, for example to more than about 10:1, for a downstream hydrogenation reaction. As another example, the ratio of $H_2$:CO in such a syngas product stream can be reduced by using a WGS catalyst(s) of the present invention in a WGS reaction (in the reverse direction as shown above) to achieve or approach the desired 2:1 ratio for methanol synthesis. Other examples will be known to a person of skill in the art in view of the teachings of the present invention.

A person of skill in the art will understand and appreciate that with respect to each of the preferred catalyst embodiments as described in the preceding paragraphs, the particular components of each embodiment can be present in their elemental state or in one or more oxide states or mixtures thereof.

Although the foregoing description is directed to the preferred embodiments of the invention, it is noted that other variations and modifications will be apparent to those skilled in the art, and which may be made without departing from the spirit or scope of the invention.

EXAMPLES

General

Small quantity catalyst composition samples are generally prepared by automated liquid dispensing robots (Cavro Scientific Instruments) on flat quartz test wafers.

Generally, supported catalysts are prepared by providing a catalyst support (e.g. alumina, silica, titania, etc.) to the wafer substrate, typically as a slurry composition using a liquid-handling robot to individual regions or locations on the substrate or by wash-coating a surface of the substrate using techniques known to those of skill in the art, and drying to form dried solid support material on the substrate. Discrete regions of the support-containing substrate are then impregnated with specified compositions intended to operate as catalysts or catalyst precursors, with the compositions comprising metals (e.g. various combinations of transition metal salts). In some circumstances the compositions are delivered to the region as a mixture of different metal-containing components and in some circumstances (additionally or alternatively) repeated or repetitive impregnation steps are performed using different metal-containing precursors. The compositions are dried to form supported catalyst precursors. The supported catalyst precursors are treated by calcining and/or reducing to form active supported catalytic materials at discrete regions on the wafer substrate.

Bulk catalysts (e.g. noble-metal-free Ni-containing catalysts) may also be prepared on the substrate. Such multi-component bulk catalysts are purchased from a commercial source and/or are prepared by precipitation or co-precipitation protocols, and then optionally treated—including mechanical pretreatment (grinding, sieving, pressing). The bulk catalysts are placed on the substrate, typically by slurry dispensing and drying, and then optionally further doped with additional metal-containing components (e.g. metal salt precursors) by impregnation and/or incipient wetness techniques to form bulk catalyst precursors, with such techniques being generally known to those of skill in the art. The bulk catalyst precursors are treated by calcining and/or reducing to form active bulk catalytic materials at discrete regions on the wafer substrate.

The catalytic materials (e.g., supported or bulk) on the substrate are tested for activity and selectivity for the WGS reaction using a scanning mass spectrometer (SMS) comprising a scanning/sniffing probe and a mass spectrometer. More details on the scanning mass spectrometer instrument and screening procedure are set forth in U.S. Pat. No. 6,248,540, in European Patent No. EP 1019947 and in European Patent Application No. EP 1186892 and corresponding U.S. application Ser. No. 09/652,489 filed Aug. 31, 2000 by Wang et al., the complete disclosure of each of which is incorporated herein in its entirety. Generally, the reaction conditions (e.g. contact time and/or space velocities, temperature, pressure, etc.) associated with the scanning mass spectrometer catalyst screening reactor are controlled such that partial conversions (i.e., non-equilibrium conversions, e.g., ranging from about 10% to about 40% conversion) are obtained in the scanning mass spectrometer, for discrimination and ranking of catalyst activities for the various catalytic materials being screened. Additionally, the reaction conditions and catalyst loadings are established such that the results scale appropriately with the reaction conditions and catalyst loadings of larger scale laboratory research reactors for WGS reactions. A limited set of tie-point experiments are performed to demonstrate the scalability of results determined using the scanning mass spectrometer to those using larger scale laboratory research reactors for WGS reactions. See, for example, Example 12 of U.S. Provisional Patent Application Ser. No. 60/434,705 entitled "Platinum-Ruthenium Containing Catalyst Formulations for Hydrogen Generation" filed by Hagemeyer et al. on Dec. 20, 2002.

Preparative and Testing Procedures

The catalysts and compositions of the present invention were identified using high-throughput experimental technology, with the catalysts being prepared and tested in library format, as described generally above, and in more detail below. Specifically, such techniques were used for identifying catalyst compositions that were active and selective as WGS catalysts. As used in these examples, a "catalyst library" refers to an associated collection of candidate WGS catalysts arrayed on a wafer substrate, and having at least two, and typically three or more common metal components (including metals in the fully reduced state, or in a partially or fully oxidized state, such as metal salts), but differing from each other with respect to relative stoichiometry of the common metal components.

Depending on the library design and the scope of the investigation with respect to a particular library, multiple (i.e., two or more) libraries were typically formed on each wafer substrate. A first group of test wafers each comprised about 100 different catalyst compositions formed on a three-inch wafer substrate, typically with most catalysts being formed using at least three different metals. A second group of test wafers each comprised about 225 different catalyst compositions on a four-inch wafer substrate, again typically with most catalysts being formed using at least three different metals. Each test wafer itself typically comprised multiple libraries. Each library typically comprised binary, ternary or higher-order compositions—that is, for example, as ternary compositions that comprised at least three components (e.g., A, B, C) combined in various relative ratios to form catalytic materials having a molar stoichiometry covering a range of interest (e.g., typically ranging from about 20% to about 80% or more (e.g. to about 100% in some cases) of each component). For supported catalysts, in addition to varying component stoichiometry for the ternary compositions, relative total metal loadings were also investigated.

Typical libraries formed on the first group of (three-inch) test wafers included, for example, "five-point libraries" (e.g., twenty libraries, each having five different associated catalyst compositions), or "ten-point" libraries (e.g., ten libraries, each having ten different associated catalyst compositions), or "fifteen-point libraries" (e.g., six libraries, each having fifteen different associated catalyst compositions) or "twenty-point libraries" (e.g., five libraries, each having twenty different associated catalyst compositions). Typical libraries formed on the second group of (four-inch) test wafers included, for example, "nine-point libraries" (e.g., twenty-five libraries, each having nine different associated catalyst compositions), or "twenty-five point" libraries (e.g., nine libraries, each having twenty-five different associated catalyst compositions). Larger compositional investigations, including "fifty-point libraries" (e.g., two or more libraries on a test wafer, each having fifty associated catalyst compositions), were also investigated. Typically, the stoichiometric increments of candidate catalyst library members ranged from about 1.5% (e.g. for a "fifty-five point ternary") to about 15% (e.g., for a "five-point" ternary). See, generally, for example, WO 00/17413 for a more detailed discussion of library design and array organization. FIGS. 3A-3F of the instant application shows library designs for libraries prepared on a common test wafer, as graphically represented using Library Studio® (Symyx Technologies, Inc., Santa Clara, Calif.), where the libraries vary with respect to both stoichiometry and catalyst loading. Libraries of catalytic materials that vary with respect to relative stoichiometry and/or relative catalyst loading can also be represented in a compositional table, such as is shown in the several examples of this application.

Figure 3:
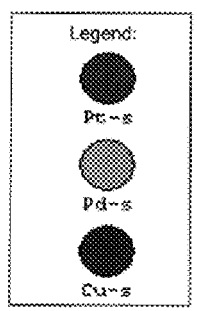
FIGS. 3A-3F illustrate the compositional make-up of various exemplary library test wafers. The legend for FIGS. 3A-3C applies only to FIGS. 3A-3C. The legend for FIGS. 3D-3F applies only to FIGS. 3D-3F.
Figure 3:
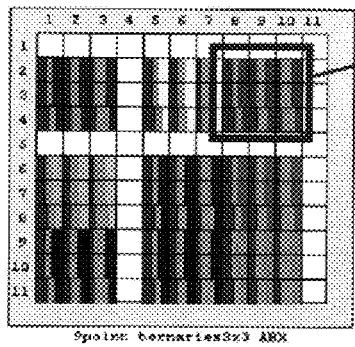
Figure 3:
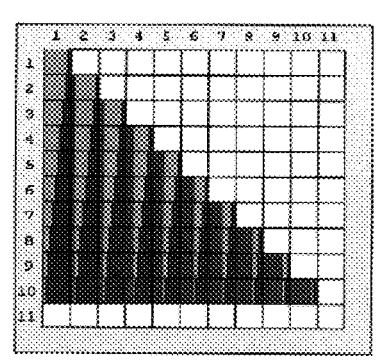
Figure 3:
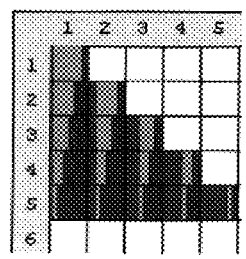
Figure 3:
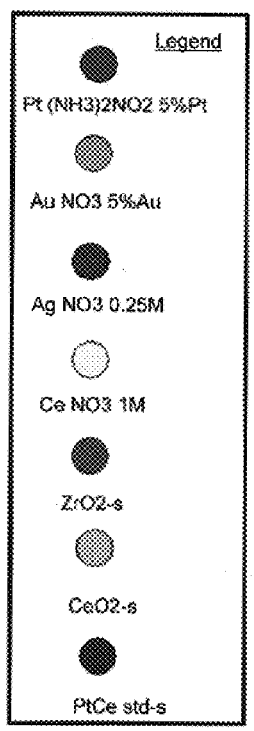
Figure 3:
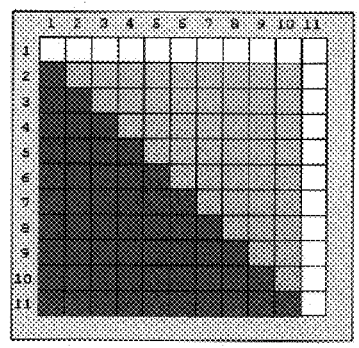
Figure 3:
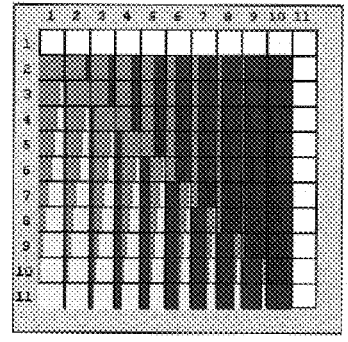
Figure 3:
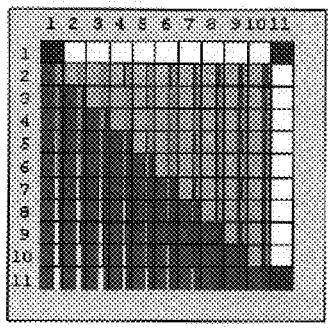

Referring to FIG. 3A, for example, the test wafer includes nine libraries, where each of the nine libraries comprise nine different ternary compositions of the same three-component system. In the nomenclature of the following examples, such a test wafer is said to include nine, nine-point-ternary ("9 PT") libraries. The library depicted in the upper right hand corner of this test wafer includes catalyst compositions comprising components A, B and $X_1$ in 9 different stoichiometries. As another example, with reference to FIG. 3B, a partial test wafer is depicted that includes a fifteen-point-ternary ("15 PT") library having catalyst compositions of Pt, Pd and Cu in fifteen various stoichiometries. Generally, the composition of each catalyst included within a library is graphically represented by an association between the relative amount (e.g., moles or weight) of individual components of the composition and the relative area shown as corresponding to that component. Hence, referring again to the fifteen different catalyst compositions depicted on the partial test wafer represented in FIG. 3B, it can be seen that each composition includes Pt (red), Pd (green) and Cu (blue), with the relative amount of Pt increasing from column 1 to column 5 (but being the same as compared between rows within a given column), with the relative amount of Pd decreasing from row 1 to row 5 (but being the same as compared between columns within a given row), and with the relative amount of Cu decreasing from a maximum value at row 5, column 1 to a minimum at, for example, row 1, column 1. FIG. 3C shows a test wafer that includes a fifty-point-ternary ("50 PT") library having catalyst compositions of Pt, Pd and Cu in fifty various stoichiometries. This test library could also include another fifty-point ternary library (not shown), for example with three different components of interest.

FIGS. 3D-3F are graphical representations of two fifty-point ternary libraries ("bis 50 PT libraries") at various stages of preparation—including a Pt—Au—Ag/$CeO_2$ library (shown as the upper right ternary library of FIG. 3E) and a Pt—Au—Ce/$ZrO_2$ library (shown as the lower left ternary library of FIG. 3E). Note that the Pt—Au—Ag/$CeO_2$ library also includes binary-impregnated compositions—Pt—Au/$CeO_2$ binary catalysts (row 2) and Pt—Ag/$CeO_2$ (column 10). Likewise, the Pt—Au—Ce/$ZrO_2$ library includes binary-impregnated compositions—Pt—Ce/$ZrO_2$ (row 11) and Au—Ce/$ZrO_2$ (column 1). Briefly, the bis 50 PT libraries were prepared by depositing $CeO_2$ and $ZrO_2$ supports onto respective portions of the test wafer as represented graphically in FIG. 3D. The supports were deposited onto the test wafer as a slurry in a liquid media using a liquid handling robot, and the test wafer was subsequently dried to form dried supports. Thereafter, salts of Pt, Au and Ag were impregnated onto the regions of the test wafer containing the $CeO_2$ supports in the various relative stoichiometries as represented in FIG. 3E (upper-right-hand library). Likewise, salts of Pt, Au and Ce were impregnated onto the regions of the test wafer containing the $ZrO_2$ supports in the various relative stoichiometries as represented in FIG. 3E (lower-left-hand library). FIG. 3F is a graphical representation of the composite library design, including the relative amount of catalyst support.

Specific compositions of tested catalytic materials of the invention are detailed in the following examples for selected libraries.

Performance benchmarks and reference experiments (e.g., blanks) were also provided on each quartz catalyst test wafer as a basis for comparing the catalyst compositions of the libraries on the test wafer. The benchmark catalytic material formulations included a Pt/zirconia catalyst standard with about 3% Pt catalyst loading (by weight, relative to total weight of catalyst and support). The Pt/zirconia standard was typically synthesized by impregnating 3 µL of, for example, 1.0% or 2.5% by weight of Pt solution onto zirconia supports on the wafer prior to calcination and reduction pretreatment.

Typically wafers were calcined in air at a temperature ranging from 300° C. to 500° C. and/or reduced under a continuous flow of 5% hydrogen at a temperature ranging from about 200° C. to about 500° C. (e.g., 450° C.). Specific treatment protocols are described below with respect to each of the libraries of the examples.

For testing using the scanning mass spectrometer, the catalyst wafers were mounted on a wafer holder which provided movement in an XY plane. The sniffing/scanning probe of the scanning mass spectrometer moved in the Z direction (a direction normal to the XY plane of movement for the wafer holder), and approached in close proximity to the wafer to surround each independent catalyst element, deliver the feed gas and transmit the product gas stream from the catalyst surface to the quadrupole mass spectrometer. Each element was heated locally from the backside using a $CO_2$ laser, allowing for an accessible temperature range of about 200° C. to about 600° C. The mass spectrometer monitored seven masses for hydrogen, methane, water, carbon monoxide, argon, carbon dioxide and krypton: 2, 16, 18, 28, 40, 44 and 84, respectively.

Catalyst compositions were tested at various reaction temperatures, typically including for example at about 200° C., 250° C. and/or 300° C. The feed gas typically consisted of 51.6% $H_2$, 7.4% Kr, 7.4% CO, 7.4% $CO_2$ and 26.2% $H_2O$. The $H_2$, CO, $CO_2$ and Kr internal standards are premixed in a single gas cylinder and then combined with the water feed. Treated water (18.1 mega-ohms-cm at 27.5° C.) produced by a Barnstead Nano Pure Ultra Water system was used, without degassing.

Data Processing and Analysis

Data analysis was based on mass balance plots where CO conversion was plotted versus $CO_2$ production. The mass spectrometer signals were uncalibrated for CO and $CO_2$ but were based on Kr-normalized mass spectrometer signals. The software package SPOTFIRE™ (sold by SpotFire, Inc. of Somerville, Mass.) was used for data visualization.

Figure 4:
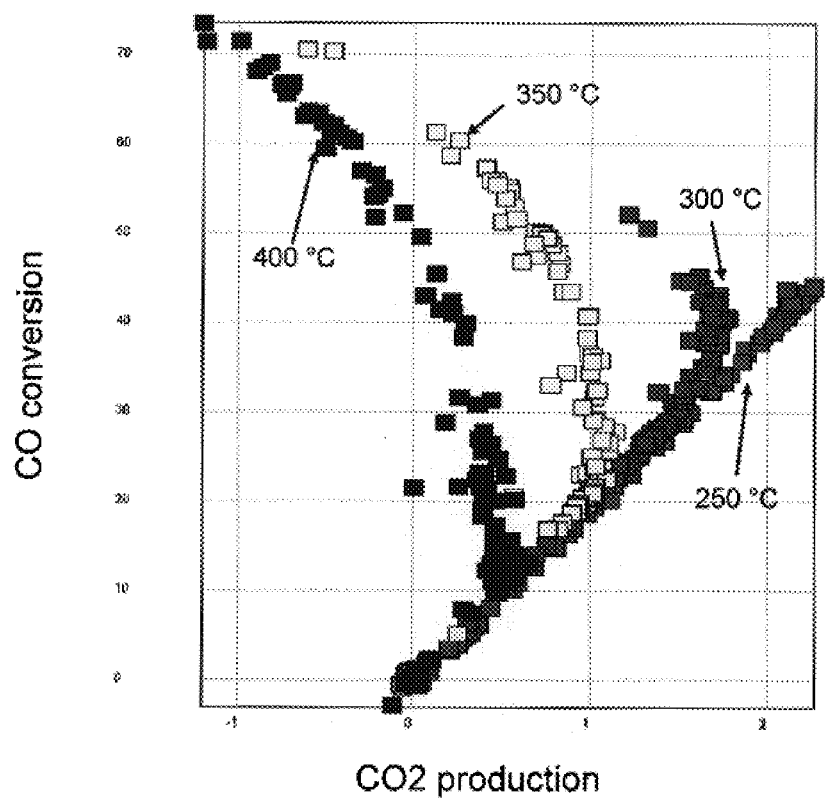
FIG. 4A illustrates a representative plot of CO conversion versus CO2 production for a prototypical library test wafer at various temperatures.
FIG. 4B illustrates the effect of catalyst selectivity and activity versus the WGS mass balance.
FIG. 4C illustrates the effect of temperature on catalyst performance under WGS conditions.
Figure 4:
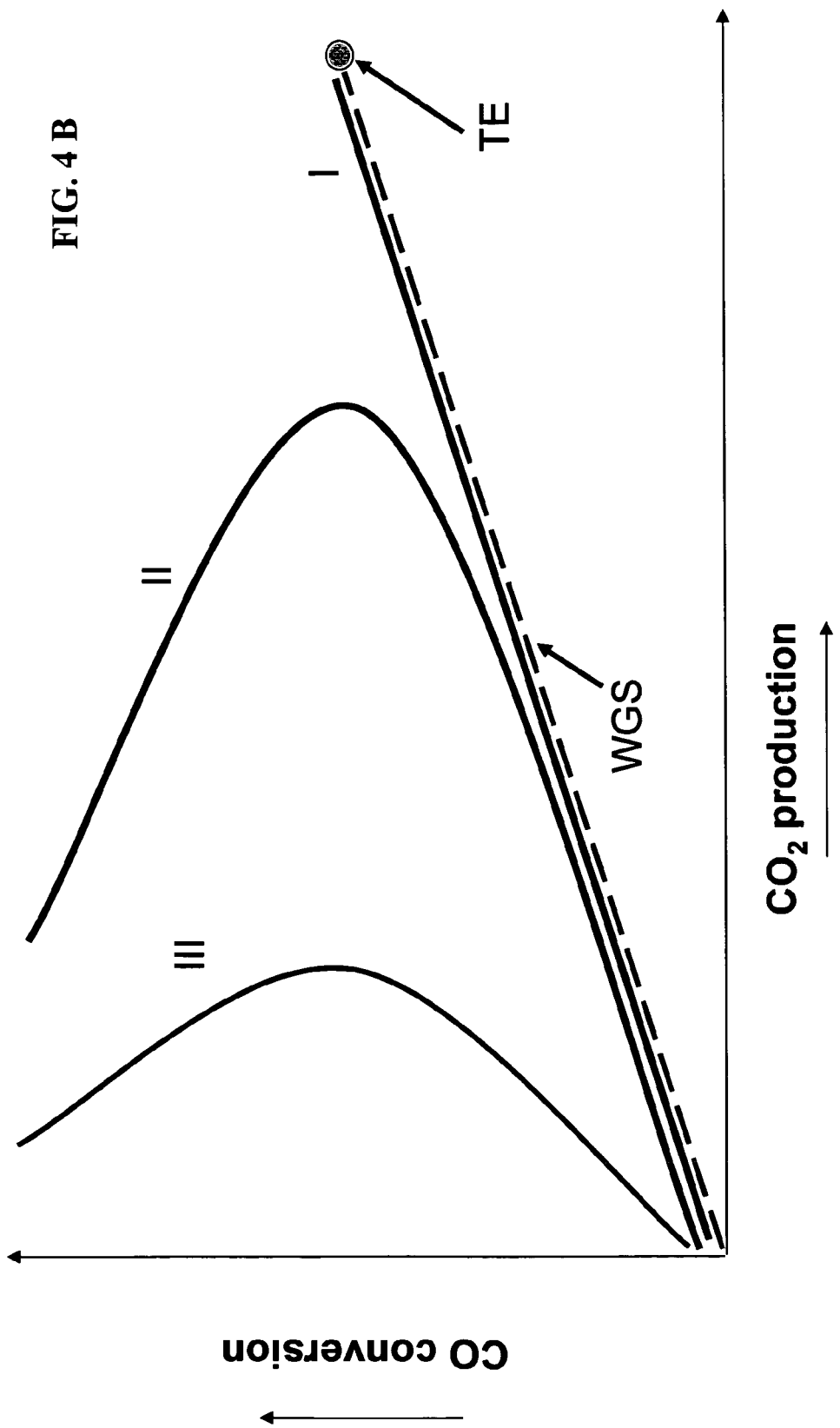
Figure 4:
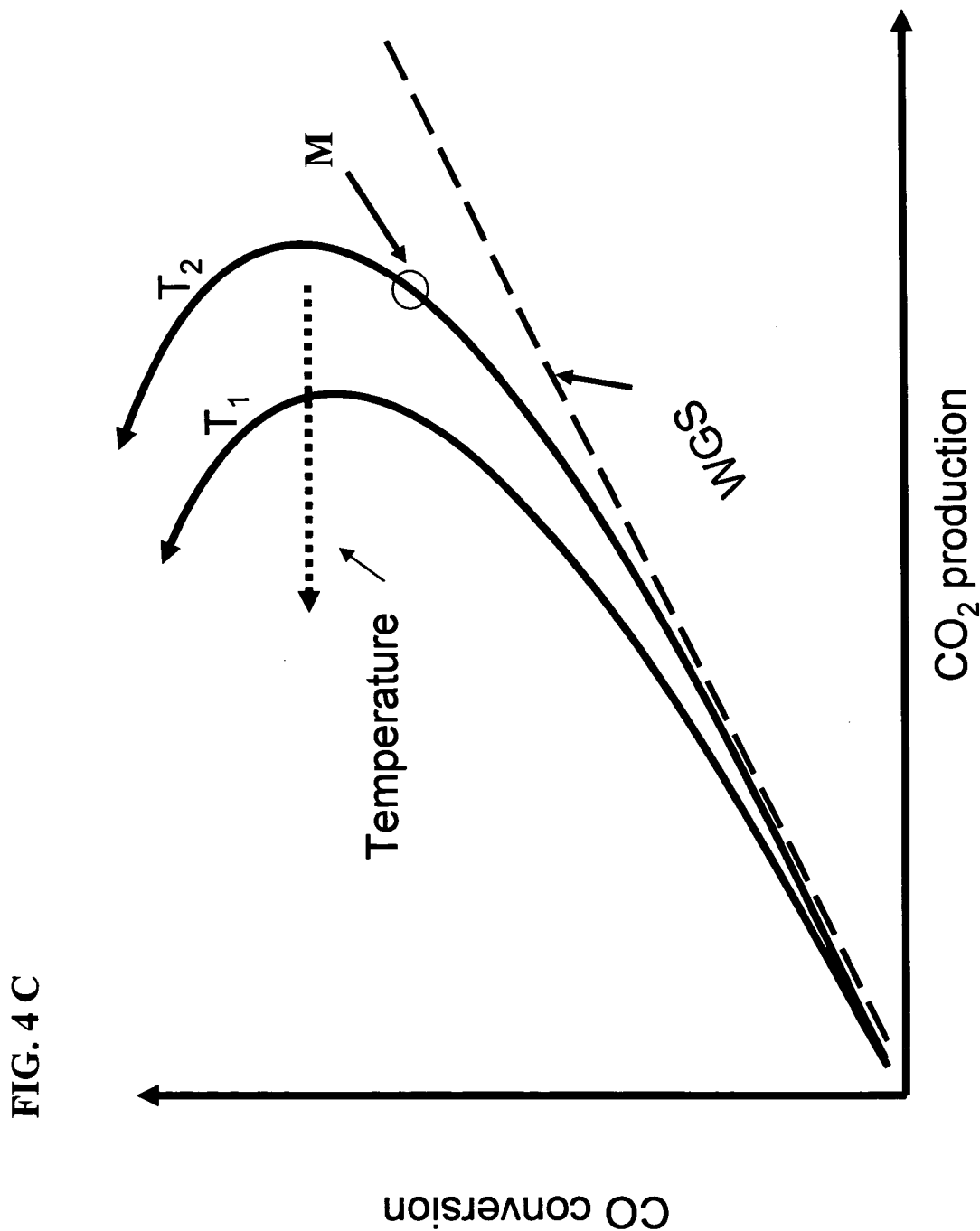

A representative plot of CO conversion versus $CO_2$ production for a WGS reaction is shown in FIG. 4A involving, for discussion purposes, two ternary catalyst systems—a Pt—Au—Ag/$CeO_2$ catalyst library and a Pt—Au—Ce/$ZrO_2$ catalyst library—as described above in connection with FIGS. 3D through 3F. The catalyst compositions of these libraries were screened at four temperatures: 250° C., 300° C., 350° C. and 400° C. With reference to the schematic diagram shown in FIG. 4B, active and highly selective WGS catalysts (e.g., Line I of FIG. 4B) will approach a line defined by the mass balance for the water-gas-shift reaction (the "WGS diagonal") with minimal deviation, even at relatively high conversions (i.e., at CO conversions approaching the thermodynamic equilibrium conversion (point "TE" on FIG. 4B). Highly active catalysts may begin to deviate from the WGS diagonal due to cross-over to the competing methanation reaction (point "M" on FIG. 4C). Catalyst compositions that exhibit such deviation may still, however, be useful WGS catalysts depending on the conversion level at which such deviation occurs. For example, catalysts that first deviate from the WGS diagonal at higher conversion levels (e.g., Line II of FIG. 4B) can be employed as effective WGS catalysts by reducing the overall conversion (e.g., by lowering catalyst loading or by increasing space velocity) to the operational point near the WGS diagonal. In contrast, catalysts that deviate from the WGS diagonal at low conversion levels (e.g., Line III of FIG. 4B) will be relatively less effective as WGS catalysts, since they are unselective for the WGS reaction even at low conversions. Temperature affects the thermodynamic maximum CO conversion, and can affect the point of deviation from the mass-balance WGS diagonal as well as the overall shape of the deviating trajectory, since lower temperatures will generally reduce catalytic activity. For some compositions, lower temperatures will result in a more selective catalyst, demonstrated by a WGS trajectory that more closely approximates the WGS mass-balance diagonal. (See FIG. 4C). Referring again to FIG. 4A, it can be seen that the Pt—Au—Ag/$CeO_2$ and the Pt—Au—Ce/$ZrO_2$ catalyst compositions are active and selective WGS catalysts at each of the screened temperatures, and particularly at lower temperatures.

Generally, the compositions on a given wafer substrate were tested together in a common experimental run using the scanning mass spectrometer and the results were considered together. In this application, candidate catalyst compositions of a particular library on the substrate (e.g., ternary or higher-order catalysts comprising three or more metal components) were considered as promising candidates for an active and selective commercial catalyst for the WGS reaction based on a comparison to the $Pt/ZrO_2$ standard composition included on that wafer. Specifically, libraries of catalytic materials were deemed to be particularly preferred WGS catalysts if the results demonstrated that a meaningful number of catalyst compositions in that library compared favorably to the $Pt/ZrO_2$ standard composition included on the wafer substrate with respect to catalytic performance. In this context, a meaningful number of compositions was generally considered to be at least three of the tested compositions of a given library. Also in this context, favorable comparison means that the compositions had catalytic performance that was as good as or better than the standard on that wafer, considering factors such as conversion, selectivity and catalyst loading. All catalyst compositions of a given library were in many cases positively identified as active and selective WGS catalysts even in situations where only some of the library members compared favorably to the $Pt/ZrO_2$ standard, and other compositions within that library compared less than favorably to the $Pt/ZrO_2$ standard. In such situations, the basis for also including members of the library that compared somewhat less favorably to the standard is that these members in fact positively catalyzed the WGS reaction (i.e., were effective as catalysts for this reaction). Additionally, it is noted that such compositions may be synthesized and/or tested under more optimally tuned conditions (e.g., synthesis conditions, treatment conditions and/or testing conditions (e.g., temperature)) than occurred during actual testing in the library format, and significantly, that the optimal conditions for the particular catalytic materials being tested may differ from the optimal conditions for the $Pt/ZrO_2$ standard—such that the actual test conditions may have been closer to the optimal conditions for the standard than for some of the particular members. Therefore, it was specifically contemplated that optimization of synthesis, treatment and/or screening conditions, within the generally defined ranges of the invention as set forth herein, would result in even more active and selective WGS catalysts than what was demonstrated in the experiments supporting this invention. Hence, in view of the foregoing discussion, the entire range of compositions defined by each of the claimed compositions (e.g., each three-component catalytic material, or each four-component catalytic material) was demonstrated as being effective for catalyzing the WGS reaction. Further optimization is considered, with various specific advantages associated with various specific catalyst compositions, depending on the desired or required commercial application of interest. Such optimization can be achieved, for example, using techniques and instruments such as those described in U.S. Pat. No. 6,149,882, or those described in WO 01/66245 and its corresponding U.S. applications, U.S. Ser. No. 09/801,390, entitled "Parallel Flow Process Optimization Reactor" filed Mar. 7, 2001 by Bergh et al., and U.S. Ser. No. 09/801,389, entitled "Parallel Flow Reactor Having Variable Feed Composition" filed Mar. 7, 2001 by Bergh et al., each of which are incorporated herein by reference for all purposes.

Additionally, based on the results of screening of initial libraries, selective additional "focus" libraries were selectively prepared and tested to confirm the results of the initial library screening, and to further identify better performing compositions, in some cases under the same and/or different conditions. The test wafers for the focus libraries typically comprised about 225 different candidate catalyst compositions formed on a four-inch wafer substrate, with one or more libraries (e.g. associated ternary compositions A, B, C) formed on each test wafer. Again, the metal-containing components of a given library were typically combined in various relative ratios to form catalysts having stoichiometry ranging from about 0% to about 100% of each component, and for example, having stoichiometric increments of about 10% or less, typically about 2% or less (e.g., for a "fifty-six point ternary"). Focus libraries are more generally discussed, for example, in WO 00/17413. Such focus libraries were evaluated according to the protocols described above for the initial libraries.

The raw residual gas analyzer ("rga") signal values generated by the mass spectrometer for the individual gases are uncalibrated and therefore different gases may not be directly compared. Methane data (mass 16) was also collected as a control. The signals are typically standardized by using the raw rga signal for krypton (mass 84) to remove the effect of gas flow rate variations. Thus, for each library element, the standardized signal is determined as, for example, $sH_2O$=raw $H_2O$/raw Kr; sCO=raw CO/raw Kr; $sCO_2$=raw $CO_2$/raw Kr and so forth.

Blank or inlet concentrations are determined from the average of the standardized signals for all blank library elements, i.e. library elements for which the composition contains at most only support. For example, $b_{avg}$ $H_2O$=average $sH_2O$ for all blank elements in the library; $b_{avg}$ CO=average sCO for all blank elements in the library; and so forth.

Conversion percentages are calculated using the blank averages to estimate the input level (e.g., $b_{avg}$ CO) and the standardized signal (e.g., sCO) as the output for each library element of interest. Thus, for each library element, $CO_{conversion}$=100×($b_{avg}$ CO−sCO)/$b_{avg}$ CO and $H_2O_{conversion}$=100×($b_{avg}$ $H_2O$−$sH_2O$)/$b_{avg}$ $H_2O$.

The carbon monoxide (CO) to carbon dioxide ($CO_2$) selectivity is estimated by dividing the amount of $CO_2$ produced ($sCO_2$−$b_{avg}$ $CO_2$) by the amount of CO consumed ($b_{avg}$ CO−sCO). The $CO_2$ and CO signals are not directly comparable because the rga signals are uncalibrated. However, an empirical conversion constant (0.6 $CO_2$ units=1 CO unit) has been derived, based on the behavior of highly selective standard catalyst compositions. The selectivity of the highly selective standard catalyst compositions approach 100% selectivity at low conversion rates. Therefore, for each library element, estimated CO to $CO_2$ selectivity=100×0.6×($sCO_2$−$b_{avg}$ $CO_2$)/($b_{avg}$ CO−sCO). Low CO consumption rates can produce highly variable results, and thus the reproducibility of $CO_2$ selectivity values is maintained by artificially limiting the $CO_2$ selectivity to a range of 0% to 140%.

The following examples are representative of the screening of libraries that lead to identification of the particularly claimed inventions herein Example 1

A 4" quartz wafer was precoated with commercial Ni bulk catalyst (Engelhard, grade 0104P) by slurry dispensing the bulk Ni onto the wafer. The slurry was composed of 1 g of the bulk Ni dissolved in 4 mL of a methyl oxide ("MEO")/ethylene glycol ("EG")/$H_2O$ (4:3:3).

The bulk Ni-precoated wafer was dried and then six internal standards were dispensed into six first row/last column wells (4 μL of zirconia slurry+3 μL of a 2.5% $Pt(NH_3)_2(NO_2)_2$ solution). The wafer was dried and then impregnated with gradients of 15 metals by Cavro dispensing from In nitrate (0.5M), Mn nitrate (0.5M), Sn oxalate (0.5M), Pb nitrate (0.5M), Te acid (0.5M), sulfuric acid (0.1M), Cd nitrate (0.5M), Ni sulfate (0.1M), ammonium-antimony-oxalate (0.3M), Sn sulfate (0.1M), Ge oxalate (0.5M), In sulfate (0.1M), Bi nitrate (0.5M), Cd sulfate (0.1M) and Zn nitrate (0.5M) stock solution vials to a microtiter plate. A replica transfer of the microtiter plate pattern to the wafer followed (3 μL dispense volume per well). The wafer was dried and then reduced in 5% $H_2/N_2$ at 380° C. for 2 hours. A commercial catalyst was slurried into 5 positions of the first row and last column as an external standard (3 μL per well). See FIGS. 1A and 1B.

The reduced library was then screened by scanning mass spectrometry ("SMS") for WGS activity with a $H_2/CO/CO_2/H_2O$ mixed feed at 330° C. and 360° C. See FIGS. 1C and 1D.

This set of experiments demonstrated active and selective WGS catalyst formulations of various modified bulk Ni formulations on the wafer.

Example 2

Scale-up catalyst samples were prepared by using incipient wetness impregnation of 0.75 grams of $ZrO_2$ support (Norton, 80-120 mesh) which had been weighed into a 10-dram vial. Aqueous metal precursor salt solutions were then added in the order: Ni, then one or more of Cd, In, and Sn. The precursor salt solutions were nickel(II) nitrate hexahydrate (1.0 M), cadmium nitrate in $NH_4OH$ 20% (w/w) (0.25 M), indium (III) nitrate (1.0 M), and tin (II) tartrate hydrate in $(CH_3)_4NOH$ 25% (w/w) (0.25 M). All starting reagents were nominally research grade from Aldrich, Strem, or Alfa. Following each metal addition, the catalysts were dried at 80° C. overnight and then calcined in air as follows:

After Ni addition—450° C. for 3 hours
After Cd, In, or Sn addition—450° C. for 3 hours Catalyst Testing Conditions Catalysts were tested in a fixed bed reactor. Approximately 0.15 g of catalyst was weighed and mixed with an equivalent mass of SiC. The mixture was loaded into a reactor and heated to reaction temperature. Reaction gases were delivered via mass flow controllers (Brooks) with water introduced with a metering pump (Quizix). The composition of the reaction mixture was as follows: $H_2$ 50%, CO 10%, $CO_2$ 10%, and $H_2O$ 30%. The reactant mixture was passed through a pre-heater before contacting the catalyst bed. Following reaction, the product gases were analyzed using a micro gas chromatograph (Varian Instruments, or Shimadzu). Compositional data on the performance diagram (FIG. 2) is on a dry basis with water removed.

Testing Results

Figure 2:
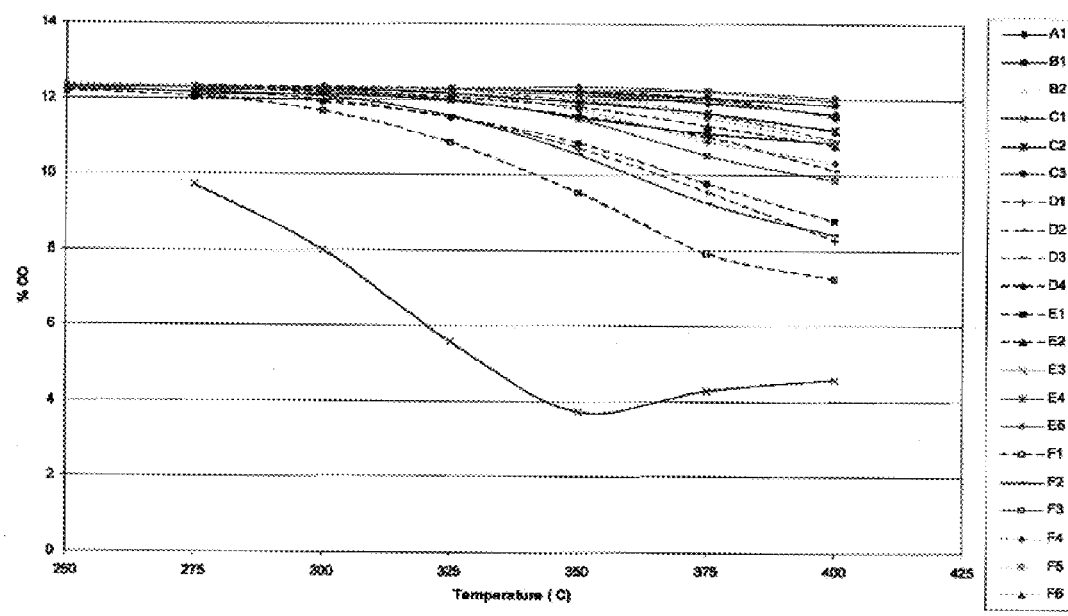
FIG. 2 illustrates plots of CO concentration versus temperature for scaled-up catalyst samples under WGS conditions.

FIG. 2 shows the CO composition in the product stream following the scale-up testing at a gas hour space velocity of 50,000 $h^{-1}$.

TABLE 1

Catalyst Compositions (mass ratio)

| Row | Col | Ni | Cd | In | Sn |
|---|---|---|---|---|---|
| A | 1 | 0.96 | 0.04 | 0 | 0 |
| B | 1 | 0.953 | 0.032 | 0.015 | 0 |
| B | 2 | 0.953 | 0.032 | 0 | 0.015 |
| C | 1 | 0.946 | 0.024 | 0.03 | 0 |
| C | 2 | 0.946 | 0.024 | 0.015 | 0.015 |
| C | 3 | 0.946 | 0.024 | 0 | 0.03 |
| D | 1 | 0.939 | 0.016 | 0.045 | 0 |
| D | 2 | 0.939 | 0.016 | 0.03 | 0.015 |
| D | 3 | 0.939 | 0.016 | 0.015 | 0.03 |

TABLE 1-continued

Catalyst Compositions (mass ratio)

| Row | Col | Ni | Cd | In | Sn |
|---|---|---|---|---|---|
| D | 4 | 0.939 | 0.016 | 0 | 0.045 |
| E | 1 | 0.932 | 0.008 | 0.06 | 0 |
| E | 2 | 0.932 | 0.008 | 0.045 | 0.015 |
| E | 3 | 0.932 | 0.008 | 0.03 | 0.03 |
| E | 4 | 0.932 | 0.008 | 0.015 | 0.045 |
| E | 5 | 0.932 | 0.008 | 0 | 0.06 |
| F | 1 | 0.925 | 0 | 0.075 | 0 |
| F | 2 | 0.925 | 0 | 0.06 | 0.015 |
| F | 3 | 0.925 | 0 | 0.045 | 0.03 |
| F | 4 | 0.925 | 0 | 0.03 | 0.045 |
| F | 5 | 0.925 | 0 | 0.015 | 0.06 |
| F | 6 | 0.925 | 0 | 0 | 0.075 |

We claim:

1. A method for producing a hydrogen-rich gas which comprises:
   contacting a CO-containing gas with a noble metal-free water gas shift catalyst in the presence of water at a temperature of not more than about 450° C.,
   wherein the water gas shift catalyst consists essentially of:
   a) Ni and
   b) at least one member selected from the group consisting of Cd, In, Sb, their oxides and mixtures thereof.

2. A method according to claim 1, wherein the water gas shift catalyst further consists essentially of at least one member selected from the group consisting of Cr, Mn, Cu, their oxides and mixtures thereof.

3. A method according to claim 1, wherein the CO-containing gas is a syngas.

4. A method according to claim 1, wherein the water gas shift catalyst consists essentially of:
   a) unsupported bulk Ni, and
   b) at least one member selected from the group consisting of Cd, Sb, their oxides and mixtures thereof.

5. A method according to claim 1, wherein the water gas shift catalyst consists essentially of:
   a) unsupported bulk Ni,
   b) In, its oxides or mixtures thereof; and
   c) Cd, its oxides or mixtures thereof.

6. A method according to claim 1, wherein the water gas shift catalyst consists essentially of:
   a) unsupported bulk Ni,
   b) Sn, its oxides or mixtures thereof; and
   c) Cd, its oxides or mixtures thereof.

7. A method according to claim 1, wherein the water gas shift catalyst consists essentially of:
   a) unsupported bulk Ni,
   b) In, its oxides or mixtures thereof; and
   c) Sb, its oxides or mixtures thereof.

8. A method according to claim 1, wherein the water gas shift catalyst consists essentially of:
   a) unsupported bulk Ni,
   b) Sn, its oxides or mixtures thereof; and
   c) Sb, its oxides or mixtures thereof.

9. A method according to claim 1, wherein the Ni is supported on a carrier.

10. A method according to claim 2, wherein the Ni is supported on a carrier.

11. A method according to claim 9, wherein the water gas shift catalyst consists essentially of:
   a) Ni
   b) at least one member selected from the group consisting of In, its oxides and mixtures thereof, and c) at least one member selected from the group consisting of Sn, Te, their oxides and mixtures thereof.

12. A method according to any one of claims 9, 10 and 11 wherein the water gas shift catalyst is supported on a carrier comprising at least one member selected from the group consisting of alumina, zirconia, titania, ceria, magnesia, lanthania, niobia, zeolite, perovskite, silica clay, yttria, cobalt oxide, iron oxide, and mixtures thereof.

13. A method according to claim 12, wherein the carrier comprises zirconia.

14. A method according to claim 12, wherein the carrier comprises cobalt oxide.

15. A method according claim 1, wherein the carbon monoxide containing gas is contacted with the water gas shift catalyst at a pressure of no more than about 50 bar.

16. A method according to claim 15, wherein the carbon monoxide containing gas is contacted with the water gas shift catalyst at a pressure of no more than about 1 bar.

17. A method according to claim 1, wherein the water gas shift catalyst comprises between about 0.05 wt. % to about 99 wt. %, with respect to the total weight of all catalyst components plus the support material, of Ni present in the water gas shift catalyst.

18. A method according to claim 15, wherein the water gas shift catalyst comprises between about 0.50 wt. % to about 99 wt. %, with respect to the total weight of all catalyst components plus the support material, of Ni present in the water gas shift catalyst.

19. A method for producing a hydrogen-rich gas which comprises:
    contacting a CO-containing gas with a noble metal-free water gas shift catalyst in the presence of water at a temperature of not more than about 450° C.,
    wherein the water gas shift catalyst consists essentially of:
    a) Ni and
    b) at least one member selected from the group consisting of Cd, In, Sb, their oxides and mixtures thereof, and wherein Ni is in a unsupported bulk state.

20. A method according to claim 19, wherein the water gas shift catalyst consists essentially of:
    a) unsupported bulk Ni, and
    b) at least one member selected from the group consisting of Cd, Sb, their oxides and mixtures thereof.

21. A method according to claim 19, wherein the water gas shift catalyst consists essentially of:
    a) unsupported bulk Ni,
    b) In, its oxides or mixtures thereof; and
    c) Cd, its oxides or mixtures thereof.

22. A method according to claim 19, wherein the water gas shift catalyst consists essentially of:
    a) unsupported bulk Ni,
    b) Sn, its oxides or mixtures thereof; and
    c) Cd, its oxides or mixtures thereof.

23. A method according to claim 19, wherein the water gas shift catalyst consists essentially of:
    a) unsupported bulk Ni,
    b) In, its oxides or mixtures thereof; and
    c) Sb, its oxides or mixtures thereof.

24. A method according to claim 19, wherein the water gas shift catalyst consists essentially of:
    a) unsupported bulk Ni,
    b) Sn, its oxides or mixtures thereof; and
    c) Sb, its oxides or mixtures thereof.

25. A method according claim 19, wherein the carbon monoxide containing gas is contacted with the water gas shift catalyst at a pressure of no more than about 50 bar.

26. A method according to claim 25, wherein the carbon monoxide containing gas is contacted with the water gas shift catalyst at a pressure of no more than about 1 bar.

27. A method according to claim 19, wherein the CO-containing gas is a syngas.

* * * * *